United States Patent
Habuka

(10) Patent No.: US 8,682,103 B2
(45) Date of Patent: Mar. 25, 2014

(54) IMAGE PROCESSING DEVICE, IMAGE PROCESSING METHOD AND IMAGE PROCESSING PROGRAM

(75) Inventor: Kensuke Habuka, Bunkyo-ku (JP)

(73) Assignee: Morpho, Inc., Tokyo (JP)

( * ) Notice: Subject to any disclaimer, the term of this patent is extended or adjusted under 35 U.S.C. 154(b) by 86 days.

(21) Appl. No.: 13/259,031

(22) PCT Filed: Oct. 15, 2010

(86) PCT No.: PCT/JP2010/068162
§ 371 (c)(1),
(2), (4) Date: Sep. 22, 2011

(87) PCT Pub. No.: WO2012/049768
PCT Pub. Date: Apr. 19, 2012

(65) Prior Publication Data
US 2012/0093436 A1   Apr. 19, 2012

(51) Int. Cl.
*G06K 9/36*   (2006.01)

(52) U.S. Cl.
USPC ........................................................ 382/284

(58) Field of Classification Search
USPC .......... 382/284, 286, 288, 294, 103, 107, 154
See application file for complete search history.

(56) References Cited

U.S. PATENT DOCUMENTS

| | | | |
|---|---|---|---|
| 6,236,748 B1 * | 5/2001 | Iijima et al. ................... | 382/154 |
| 6,549,681 B1 * | 4/2003 | Takiguchi et al. ............ | 382/294 |
| 7,486,801 B2 * | 2/2009 | Suzuki et al. ................. | 382/103 |
| 2009/0028462 A1 | 1/2009 | Habuka et al. | |

FOREIGN PATENT DOCUMENTS

| | | |
|---|---|---|
| JP | 2002-42109 A | 2/2002 |
| JP | 2006-119730 A | 5/2006 |
| JP | 2006-345400 A | 12/2006 |
| JP | 2009-33224 A | 2/2009 |
| JP | 2009-333392 A | 2/2009 |

OTHER PUBLICATIONS

International Search Report for PCT/JP2010/068162 dated Nov. 16, 2010.
Office Action for Japanese Patent Application 2010-542864 dated Aug. 1, 2011.
International Preliminary Report on Patentability in International Application No. PCT/JP2010/068162 dated May 16, 2013.
Chinese Office Action, Serial No. 20108001214.9, dated Jan. 8, 2014.

* cited by examiner

*Primary Examiner* — Yon Couso
(74) *Attorney, Agent, or Firm* — Sughrue Mion, PLLC

(57) ABSTRACT

An image processing device that accumulatively generates a synthetic image by joining a first image, which is a single image or is constituted by a plurality of the images joined together, and a second image that is input, every time when the second image is input, the device comprising: a center-position obtainment portion (11) that obtains position information on a first center point being a center point of each of the images constituting the first image and position information on a second center point being a center point of the second image; and a synthetic image generation portion (12) that obtains the first center point of an image overlapping the second image among the images constituting the first image, and that joins the first image and the second image to generate the synthetic image, using perpendicular bisectors between the obtained first center points and the second center point as a joint between the first image and the second image, based on the obtained position information on the first center points and the obtained position information on the second center point.

15 Claims, 9 Drawing Sheets

IMAGE PROCESSING DEVICE, IMAGE PROCESSING METHOD AND IMAGE PROCESSING PROGRAM

TECHNICAL FIELD

The present invention relates to an image processing device, an image processing method and an image processing program.

BACKGROUND ART

Conventionally, as an image processing device, there is known a device that joins captured images to produce a panorama still image which is a single wide-angle still image (for example, see patent document 1). When first image and second image are joined, an image processing device disclosed in patent document 1 determines the position of the first image and the second image by performing pattern matching on a small region in a region where the first image and the second image overlap, clips the overlap region from one of the images, joins the image whose overlap region is clipped and the other image to produce a panorama still image.

CITATION LIST

Patent Literature

Patent document 1: Japanese Unexamined Patent Application Publication No. H05-67208

SUMMARY OF INVENTION

Technical Problem

However, in the device disclosed in patent document 1, since it is necessary to perform processing for determining the outer edge of the overlap region, a processing load may be increased. In addition, for example, when first image, second image and third image are synthesized, it is necessary to record each of the images and perform pattern matching thereon. Hence, as the number of images to be joined increases, the processing load and necessary resources may increase.

The present invention is made to solve the foregoing technical problem; an object of the present invention is to provide an image processing device, an image processing method and an image processing program that can enhance the quality of a synthetic image while reducing a load of a synthesizing process of a plurality of images.

Solution to Problem

An image processing device according to the present invention is one that accumulatively generates a synthetic image by joining a first image, which is a single image or is constituted by a plurality of the images joined together, and a second image that is input, every time when the second image is input, the device comprising: a center-position obtainment portion that obtains position information on a first center point being a center point of each of the images constituting the first image and position information on a second center point being a center point of the second image; and a synthetic image generation portion that obtains the first center points of an image overlapping the second image among the images constituting the first image, and that joins the first image and the second image to generate the synthetic image, using perpendicular bisectors between the obtained first center points and the second center point as a joint between the first image and the second image, based on the obtained position information on the first center points and the obtained position information on the second center point.

In the image processing device according to the present invention, the center-position obtainment portion obtains position information on the first center point of each of the images constituting the first image and the second center point of the second image, and the synthetic image generation portion obtains the first center point of the image which overlaps the second image among the images constituting the first image, and joins the first image and the second image to generate the synthetic image, using perpendicular bisectors between the obtained first center points and the second center point as a joint between the first image and the second image, based on the obtained position information on the first center points and the obtained position information on the second center point. As described above, when the first image and the second image which is input are accumulatively synthesized, the both images can be joined by specifying the joint of the images from the information on the center points of the images, and thus sequential synthesizing processing can be realized at high speed and with low load. Moreover, since a deviation amount between the two images can be reduced by using the perpendicular bisector, a quality of the synthetic image can be improved.

Here, the first image may be either an image input immediately before the second image or the synthetic image generated by the synthetic image generation portion.

The center-position obtainment portion may obtain a motion vector based on the first image and the second image, and obtain the position information based on the obtained motion vector. With this configuration, it is possible to rapidly and appropriately determine the position of the second image to be joined.

The synthetic image generation portion may determine a pixel value at a predetermined position of the synthetic image based on a distance from a perpendicular bisector between the first center point being closest to the predetermined position and the second center point. With this configuration, a pixel value at a predetermined position of the synthetic image can be determined from the information on the distance from the perpendicular bisector, and thus it is possible to synthesize images by simple computation processing.

The synthetic image generation portion may determine a pixel value of the first image as the pixel value at the predetermined position when the distance is more than a predetermined value and the predetermined position is closer to the first center point than to the second center point, determine a pixel value of the second image as the pixel value at the predetermined position when the distance is more than the predetermined value and the predetermined position is closer to the second center point than to the first center point, and determine a pixel value at the predetermined position by synthesizing the pixel value of the first image and the pixel value of the second image when the distance is not more than the predetermined value.

With this configuration, the region where pixel values are synthesized can be limited from the perpendicular bisector to a region within a predetermined range, and thus it is possible not only to perform processing for generating the synthetic image at high speed but also to reduce, for example, even when the second image is blurred or displaced, its influences exerted on the synthetic image and generate the smooth synthetic image.

The synthetic image generation portion may regard a position in grid points arranged in the grid-arrayed points as the predetermined position and records the first center point being closest to the grid point for each of the grid points.

As described above, the first center point being closest to the grid point is recorded, and thus it is unnecessary to compare the center points of all images constituting the first image with the center point of the second image, for each of the pixels in the region where the first image and the second image overlap. It is therefore possible to reduce the processing time or the processing cost.

The synthetic image generation portion may determine a pixel value within a block surrounded by the grid points based on the distance determined for each of the grid points.

With this configuration, the pixel value within the block can be determined without calculating all the distances in each of the pixel positions within the block, and thus it is possible to decrease a load on the computation processing.

The synthetic image generation portion may determine the pixel values of the first image as the pixel values within the block when the distances of all the grid points surrounding the block are more than the predetermined value and positions of all the grid points surrounding the block are closer to the first center point than to the second center point, and determine the pixel values of the second image as the pixel values within the block when the distances of all the grid points surrounding the block are more than the predetermined value and positions of all the grid points surrounding the block are closer to the second center point than to the first center point.

With this configuration, since a determination is made as to whether or not copying is conducted for each of the blocks surrounded by the grid points, and thus the synthesizing process can be performed on an individual block basis, it is possible to further decrease a load on the computation processing.

The synthetic image generation portion may update, after generating the synthetic image, the closest first center point for each of the grid points. With this configuration, it is possible to appropriately perform the sequential synthesizing.

An image processing method according to the present invention is an image processing method of accumulatively generating a synthetic image by joining a first image, which is a single image or is constituted by a plurality of the images joined together, and a second image that is input, every time when the second image is input, the method comprising: a center-position obtainment step of acquiring position information on a first center point which is a center point of each of the images constituting the first image and position information on a second center point which is a center point of the second image; and a synthetic image generation step of acquiring the first center points of images which overlaps the second image among the images constituting the first image, and of joining the first image and the second image to generate the synthetic image, using perpendicular bisectors between the obtained first center points and the second center point as a joint between the first image and the second image, based on the obtained position information on the first center points and the obtained position information on the second center point.

According to the image processing method of the present invention, the same advantages as those of the above-described image processing device of the present invention can be exerted.

An image processing program according to the present invention is an image processing program causing a computer so as to accumulatively generates a synthetic image by joining a first image, which is a single image or is constituted by a plurality of the images joined together, and a second image that is input, every time when the second image is input, the program causing the computer to function as: a center-position obtainment portion that obtains position information on a first center point which is a center point of each of the images constituting the first image and position information on a second center point which is a center point of the second image; and a synthetic image generation portion that obtains the first center points of images which overlaps the second image among the images constituting the first image, and that joins the first image and the second image to generate the synthetic image, using perpendicular bisectors between the obtained first center points and the second center point as a joint between the first image and the second image, based on the obtained position information on the first center points and the obtained position information on the second center point.

According to the image processing program of the present invention, the same advantages as those of the above-described image processing device can be exerted.

Advantageous Effects of Invention

According to the present invention, it is possible to enhance the quality of a synthesized image while reducing a load of performing synthesizing process on a plurality of images.

DESCRIPTION OF EMBODIMENTS

Figure 1:
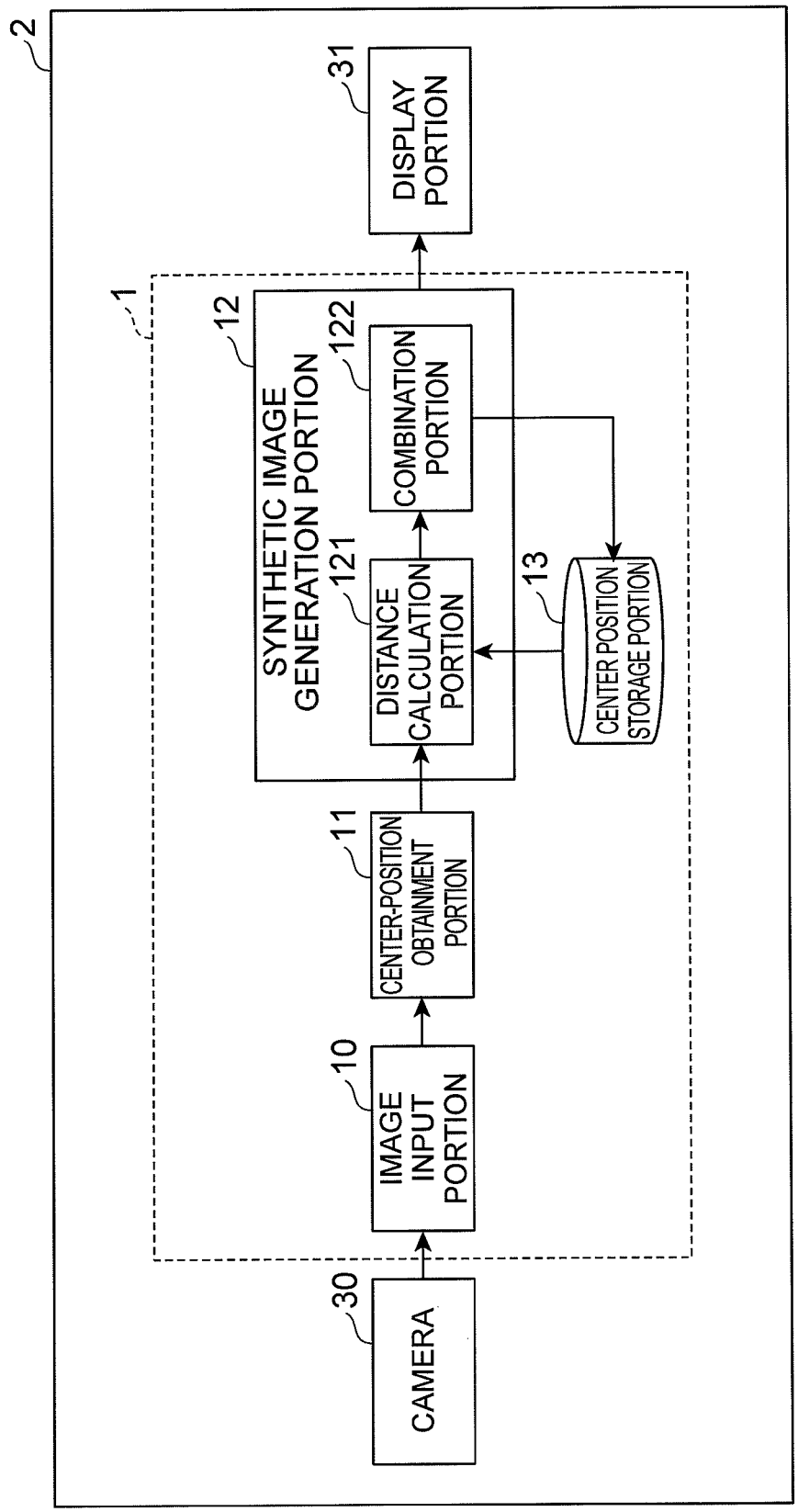
FIG. 1 is a functional block diagram of a mobile terminal incorporating an image processing device of an embodiment.

An embodiment of the present invention will be described below by referring to the attached drawings. In each figure, the same reference numerals are given to the same or corresponding components and duplicated explanation will be omitted.

An image processing device according to this embodiment is a device that accumulatively generates a single image by joining input images at each input and is favorably employed, for example, if a plurality of continuously picked up images is joined on a real time basis so as to generate a panoramic image having a wider angle than the single picked up image.

The image processing device according to this embodiment is favorably mounted on a mobile terminal with limited resource such as a mobile phone, a digital camera, a PDA (Personal Digital Assistant) and the like, but it is not limited to such devices and the image processing device may be mounted on a usual computer system, for example. In the following, for facilitation of understanding, an image processing device to be mounted on a mobile terminal provided with a camera function will be described as an example of the image processing device according to the present invention.

Figure 2:
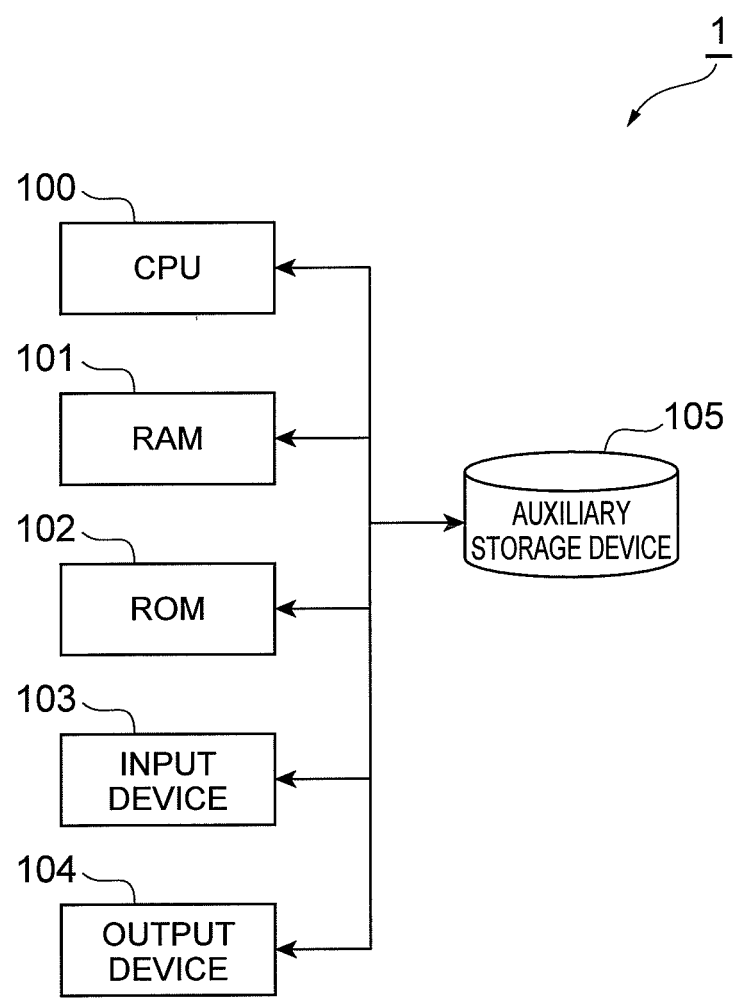
FIG. 2 is a diagram showing the hardware configuration of the mobile terminal incorporating the image processing device of the embodiment.

FIG. 1 is a functional block diagram of a mobile terminal 2 provided with an image processing device 1 according to this embodiment. The mobile terminal 2 shown in FIG. 1 is a mobile terminal carried by a user, for example, and has a hardware configuration shown in FIG. 2. FIG. 2 is a hardware configuration diagram of the mobile terminal 2. As shown in FIG. 2, the mobile terminal 2 is physically constituted as a usual computer system including a CPU (Central Processing Unit) 100, main storage devices such as a ROM (Read Only Memory) 101, a RAM (Random Access Memory) 102 and the like, an input device 103 such as a camera, a keyboard and the like, an output device 104 such as a display, an auxiliary storage device 105 such as a hard disk and the like. Each function of the mobile terminal 2 and the image processing device 1, which will be described later, is realized by having a predetermined computer software read in a hardware such as the CPU 100, the ROM 101, the RAM 102 and the like so as to operate the input device 103 and the output device 104 under control of the CPU 100 and data reading and writing in the main storage device and the auxiliary storage device 105. The above explanation is made as a hardware configuration of the mobile terminal 2, but the image processing device 1 may be constituted as a usual computer system including the main storage device such as the CPU 100, the ROM 101, the RAM 102 and the like, the input device 103, the output device 104, the auxiliary storage device 105 and the like. Also, the mobile terminal 2 may be provided with a communication module and the like.

As shown in FIG. 1, the mobile terminal 2 is provided with a camera 30, the image processing device 1 and a display portion 31. The camera 30 has a function of picking up an image. As the camera 30, an image pickup element or the like is used. The camera 30 has a continuous image pickup function of repeatedly picking up images with a predetermined interval from timing specified by a user operation and the like, for example. The user can take continuous images overlapping at least vertically and horizontally by sliding the camera 30, for example. And the camera 30 has a function of outputting the picked up image to the image processing device 1 at each pickup, for example.

The image processing device 1 includes an image input portion 10, a center-position obtainment portion 11, a synthetic image generation portion 12 and a center-position storage portion 13.

The image input portion 10 has a function of inputting an image picked up by the camera 30. The image input portion 10 has a function of inputting an image picked up by the camera 30 at each pickup, for example. Also, the image input portion 10 has a function of storing the first input image in a first temporary storage region provided in the mobile terminal 2. Also, the image input portion 10 has a function of storing images input continuously at the upcoming and thereafter time in a second temporary storage region provided in the mobile terminal. As will be described later, the second temporary storage region is updated at each input of a new image and the first temporary storage region overwrites and stores the image accumulatively synthesized at each image input (intermediate synthetic image). The image stored in the first temporary storage region is referred to as a first image and the image stored in the second temporary storage region as a second image in the following description.

The center-position obtainment portion 11 has a function of obtaining position information of a center point of an image (initial first image or the second image) input by the image input portion 10. The center point is a point determined unambiguously from the outer edge of the image. The position information may be position information associated with an actual space or relative position information associated among images continuously input. The center-position obtainment portion 11 has a function of detecting a motion of a camera (motion vector) on the basis of an input image and an image input immediately before in order to obtain the position information. Also, the center-position obtainment portion 11 has a function of calculating the position information of the center point of the input image on the basis of the obtained motion vector and the position information of the center point of the image input immediately before. The center-position obtainment portion 11 obtains the position information of the center point only with the image for the image input first (initial first image) and obtains the position information of the center point on the basis of the motion vector obtained by using the input image and the image input immediately before for the image that is input thereafter (second image). For the second image input at the n-th time (n>1), for example, the motion vector is obtained by using the second image and the second image input at the (n−1)-th time, and the position information of the center point of the second image input at the n-th time is obtained on the basis of the obtained motion vector. Here, the center-position obtainment portion 11 may calculate the motion vector by reducing the image input immediately before and by using the image further made to be formed only by a brightness element instead of the image input immediately before. By working on the image input immediately before so as to obtain the motion vector, processing time or processing cost can be reduced. In the following description, the center point of each of the image constituting the first image will be referred to as a first center point and the center point of the second image as a second center point. Moreover, the center-position obtainment portion 11 has a function of outputting the position information of the obtained center point to the synthetic image generation portion 12.

The synthetic image generation portion 12 has a function of generating a synthetic image in which the input image (second image) and the already input image (first image) are joined, and comprises a distance calculation portion 121 and a synthesizing portion 122.

The distance calculation portion 121 has a function of specifying an image overlapping the second image among the images constituting the first image on the basis of the motion vector obtained by the center-position obtainment portion 11, for example. The distance calculation portion 121 has a function of specifying the first center point being closest to a predetermined position of the image overlapping the second image and of calculating a distance between the specified first center point and the second center point of the second image. Here, in order to speed up the above calculation processing, the predetermined position is a position indicated by one of grid-arrayed points. For example, the grid points are arrayed in a synthetic image (first image, here) and used as the above-mentioned predetermined position. The distance calculation portion 121 has a function of specifying the first center point being closest to the grid point for each grid point before the calculation of the distance between the first center point and the second center point and of storing it in the center-position storage portion 13 in advance. That is, the center-position storage portion 13 stores the grid point included in the first image and the first center point being closest to the grid point in association with each other. In this case, the distance calculation portion 121 specifies the image overlapping the input second image among the images constituting the first image and obtains the first center point being closest to the specified grid point by referring to the center-position storage portion 13. If there is a plurality of images overlapping the second image among the images constituting the first image, the closest first center point might be different depending on the grid point. In this case, the distance calculation portion 121 calculates the distance between the first center point different among the grid points and the second center point. The distance calculation portion 121 has a function of outputting the calculated distance to the synthesizing portion 122.

Figure 3:
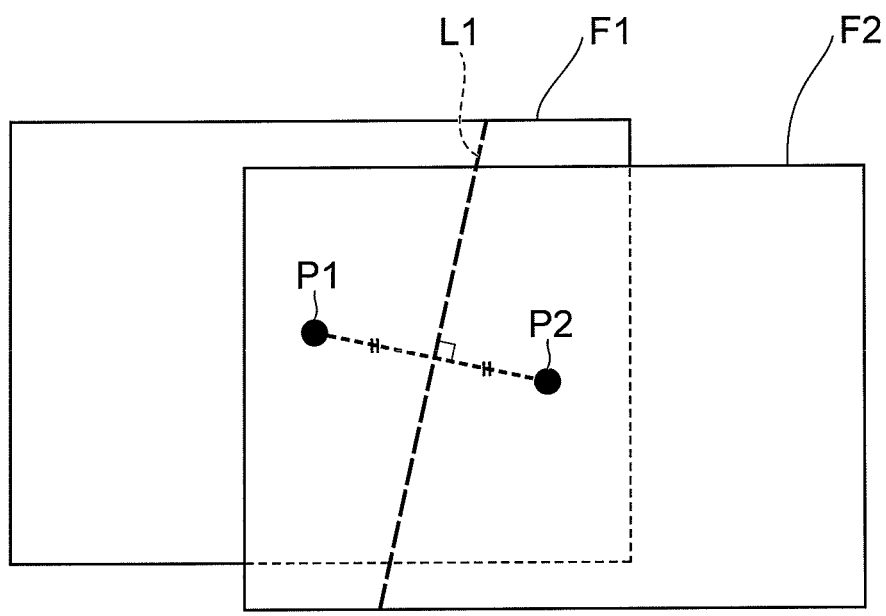
FIG. 3 is a schematic diagram illustrating a distance between a center point of an image that has been already input and a center point of an image that is thereafter input.
Figure 4:
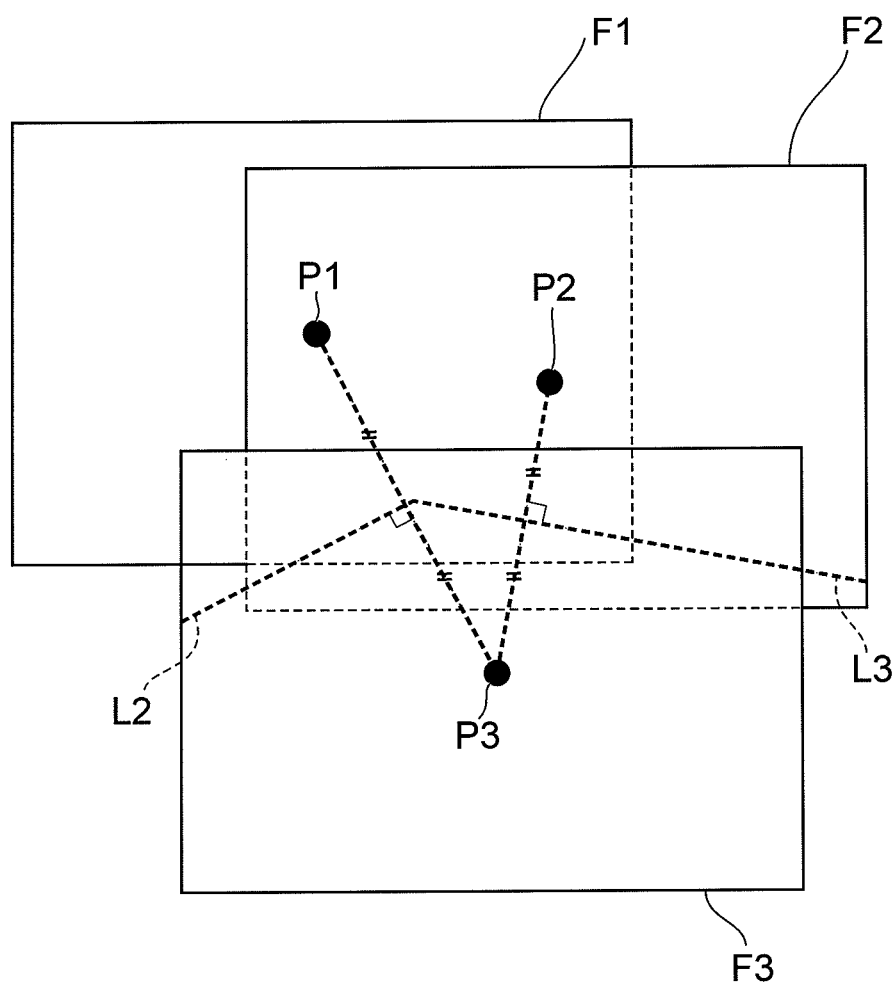
FIG. 4 is a schematic diagram illustrating a distance between a center point of a synthetic image and the center point of the image that is thereafter input.

The synthesizing portion 122 has a function of joining the first image and the second image on the basis of the distance between the first center point and the second center point calculated by the distance calculation portion 121. For example, the synthesizing portion 122 has a function of determining a pixel value at the predetermined position on the basis of the distance to the perpendicular bisector between the first center point being closest to the predetermined position and the second center point at the predetermined position in the synthetic image. FIGS. 3 and 4 are outline diagrams for explaining the perpendicular bisector between the first center point and the second center point. As shown in FIG. 3, a perpendicular bisector L1 can be drawn between a first center point P1 of the first image F1 and a second center point P2 of the second image F2. Then, by calculating the distance to the perpendicular bisector L1 at the predetermined position in the synthetic image, the pixel value at the predetermined position is determined. Also, as shown in FIG. 4, if the first image is constituted by a plurality of images F1 and F2, perpendicular bisectors L2 and L3 with the second center point P3 can be drawn for each of the first center points P1 and P2. As described above, if there is a plurality of first center points, a plurality of perpendicular bisectors can be drawn. And by calculating the distance to the perpendicular bisector at the predetermined position in the synthetic image, the pixel value at the predetermined position is determined.

As described above, the synthesizing portion 122 uses the distance to the perpendicular bisector in order to employ the pixel value of the image closest to the synthetic position in the first image and the second image as the pixel value of the synthetic position. In other words, the synthesizing portion 122 uses the distance from the predetermined position in the synthetic image to the perpendicular bisector as an evaluation value for evaluating closeness of the input image. For example, the synthesizing portion 122 evaluates closeness T of the input image by the following formula 1:

[Formula 1]

$$T = \frac{A^2 - B^2}{C} \qquad (1)$$

where A is a distance from the predetermined position to be synthesized to the second center point, B is a distance from the predetermined position to be synthesized to the closest first center point, and C is a distance from the first center point to the second center point.

The synthesizing portion 122 determines the pixel values at the synthetic position using the closeness T obtained by the formula 1 as an evaluation value. For example, the synthesizing portion 122 sets the pixel value of the first image as the pixel value of the predetermined position if the distance from the predetermined position to the perpendicular bisector is larger than a predetermined value and the predetermined position is closer to the first center point than the second center point. On the other hand, the synthesizing portion 122 sets the pixel value of the second image as the pixel value of the predetermined position if the distance from the predetermined position to the perpendicular bisector is larger than the predetermined value and the predetermined position is closer to the second center point than the first center point. If the distance from the predetermined position to the perpendicular bisector is not more than the predetermined value, the synthesizing portion 122 synthesizes the pixel value of the first image and the pixel value of the second image and sets the resulting value as the pixel value of the predetermined position. As a method of synthesizing, a conventional method can be employed, and a method in which an average value of the pixel value of the first image and the pixel value of the second pixel or a weighted average value thereof is set as the pixel value of the predetermined position is used. As described above, the synthesizing portion 122 has a function of determining which of the first center point or the second center point is closer to the predetermined position of the synthetic image with respect to the perpendicular bisector as the border and of determining which of the pixel values of the first image or the second image is to be employed. If the predetermined position is adjacent to the perpendicular bisector, that is, if the predetermined position is located within the distance from the perpendicular bisector not more than the predetermined value in the synthetic images, the synthesizing portion 122 has a function of synthesizing the pixel value of the first image and the pixel value of the second image so as to reduce a brightness difference of the joint and of generating a synthetic image with a smaller sense of discomfort. That is, the pixel value at the predetermined position is determined using the closeness T as the evaluation value as shown below:

$T > W$ Region copy is not executed $-W \leq T \leq W$ Synthesizing processing $T < -W$ Region copy is executed [Formula 2]

As the predetermined value W used in determination on whether or not the pixel values are to be synthesized, for example, 16 (pixels) is used. In this case, at the image position within 8 pixels with respect to the perpendicular bisector, the pixel value of the first image and the pixel value of the second image are synthesized.

The grid points in the synthetic image are grid-arrayed so as to include the entire first image before the input of the second image. On the other hand, after the input of the second image, the grid points are newly added so as to include not only the first image but also the second image. By employing the grid points as the predetermined position, it is no longer necessary to calculate the distance to the perpendicular bisector for all the positions (pixel positions) included in the synthetic image, and therefore the processing load can be reduced. Moreover, the synthesizing portion 122 can read the first center point being closest to the grid point at high speed by referring to the center-position storage portion 13. As a result, it is no longer necessary to compare the position of the first center points of all the images synthesized in the past with the position of the grid point, and therefore it is possible to reduce the processing time or the processing cost. For more speed-up, the synthesizing portion 122 has a function of determining the pixel value in the block surrounded by the grid points on the basis of the determination result at the grid point. For example, the synthesizing portion 122 has a function of determining the pixel value at the grid point on the basis of the distance to the perpendicular bisector between the first center point being closest to the grid point and the second center point in the grid-arrayed points in the synthetic image. The synthesizing portion 122 employs the pixel value of the first image for the block (region) surrounded by the grid points having pixel values determined as the first image. That is, the synthesizing portion 122 proceeds to process the subsequent block without executing any processing for this block. On the other hand, the synthesizing portion 122 employs the pixel value of the second image for the block surrounded by the grid points having pixel values determined as the second image. That is, the synthesizing portion 122 copies that of the second image as it is for this block. Then, if all the pixel values at the grid points surrounding the block are not the first image or the second image, that is, if the block crosses the perpendicular bisector, the synthesizing portion 122 has a function of setting the pixel value in the block as the synthetic value of the pixel values of the first image and the second image. In this case, by acquiring the closeness T at the pixel position in the block from the closeness T at the grid point through linear interpolation and by evaluating the result by the above-mentioned evaluating method, the pixel position to be synthesized can be specified appropriately.

Also, the synthesizing portion 122 comprises a function of updating the closest first center point recorded for each grid point after the synthetic image is generated by the above processing. For example, if the synthetic image is generated by joining the first image and the second image, the closest first center point might be changed depending on the grid point included in this synthetic image. Thus, after the joining processing is performed, by executing the processing of updating the closest first center point, accurate information of the closest first center point can be maintained.

Moreover, the synthesizing portion 122 overwrites and stores the synthetic image created by joining the first image and the second image in the first temporary storage region. As described above, the synthesizing portion 122 stores the latest synthetic image in the first temporary storage region. That is, if there is the second image to be input next, the processing of joining the second image to the latest synthetic image (intermediate synthetic image) is performed. As described above, the synthesizing portion 122 does not record and maintain all the images to be synthesized for the reference, but makes the synthesizing of the images possible with small memory amount by accumulatively synthesizing the input images. Also, the synthesizing portion 122 has a function of outputting the synthetic image stored in the first temporary storage region to the display portion 31. The display portion 31 is connected to the synthetic image generation portion 12 and has a function of notifying a user of the output of the synthetic image. As the display portion 31, a liquid crystal display or the like is used, for example.

Figure 5:
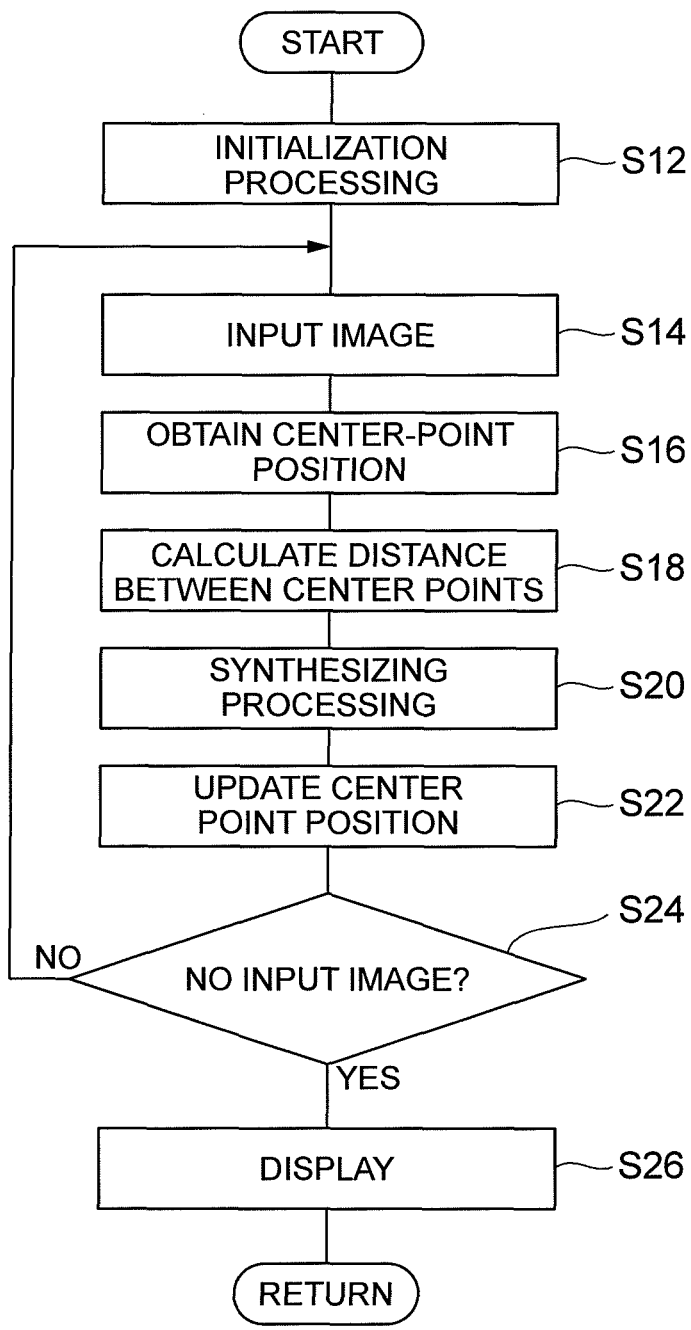
FIG. 5 is a flowchart showing the operation of the image processing device of the embodiment.
Figure 6:
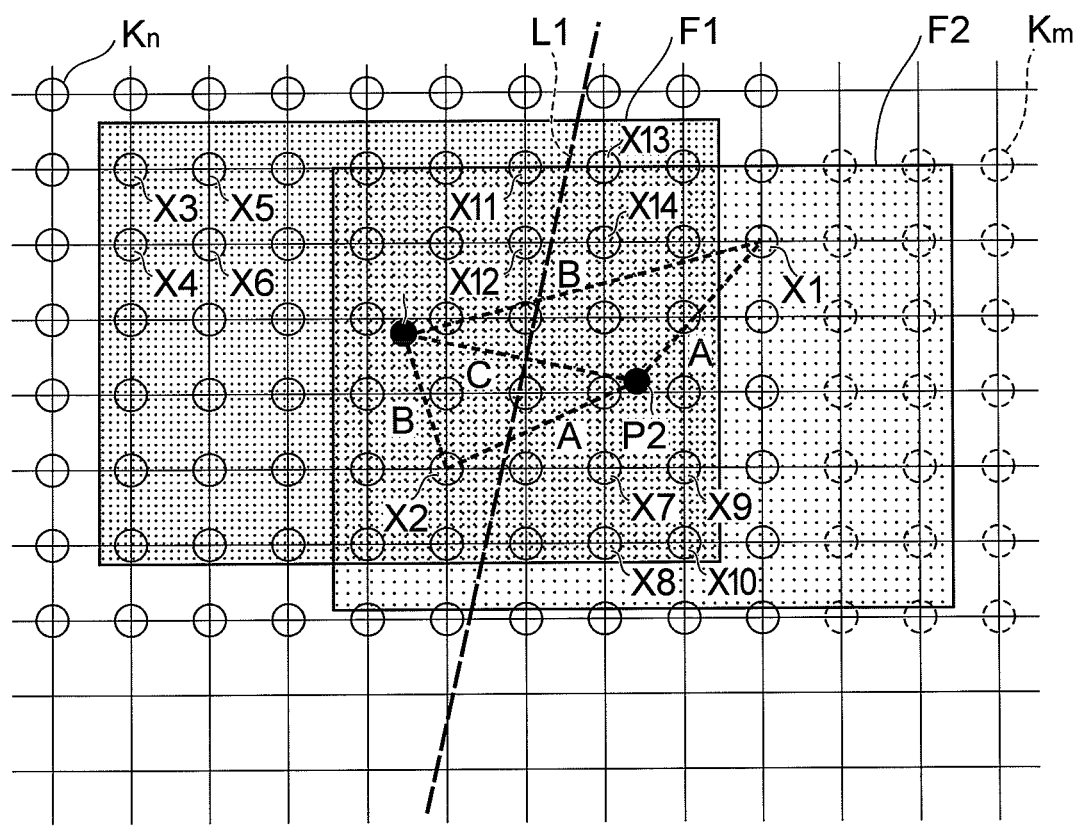
FIG. 6 is a schematic diagram illustrating the synthesis between the image that has been already input and the image that is thereafter input.
Figure 7:
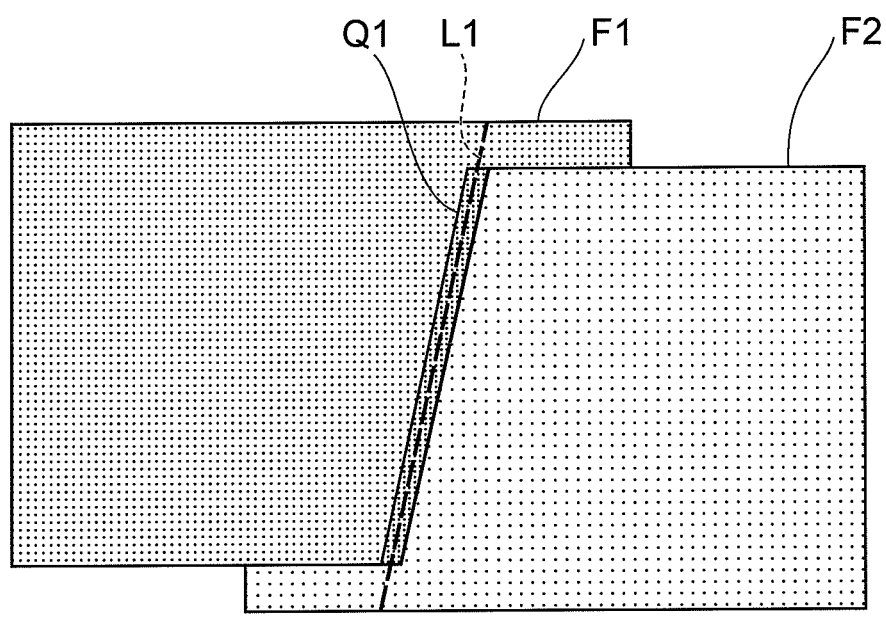
FIG. 7 is a schematic diagram illustrating the synthetic image.
Figure 8:
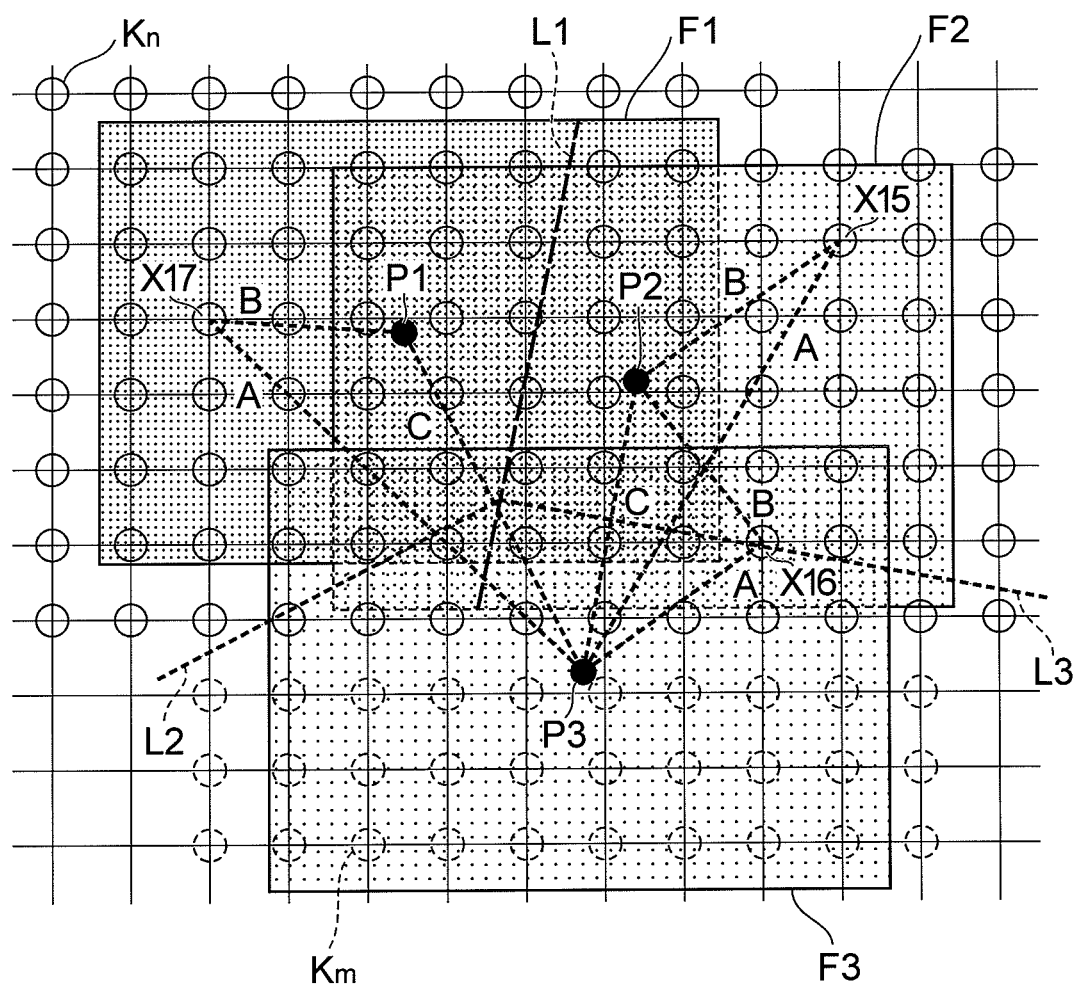
FIG. 8 is a schematic diagram illustrating the synthesis between the synthetic image and the image that is thereafter input.
Figure 9:
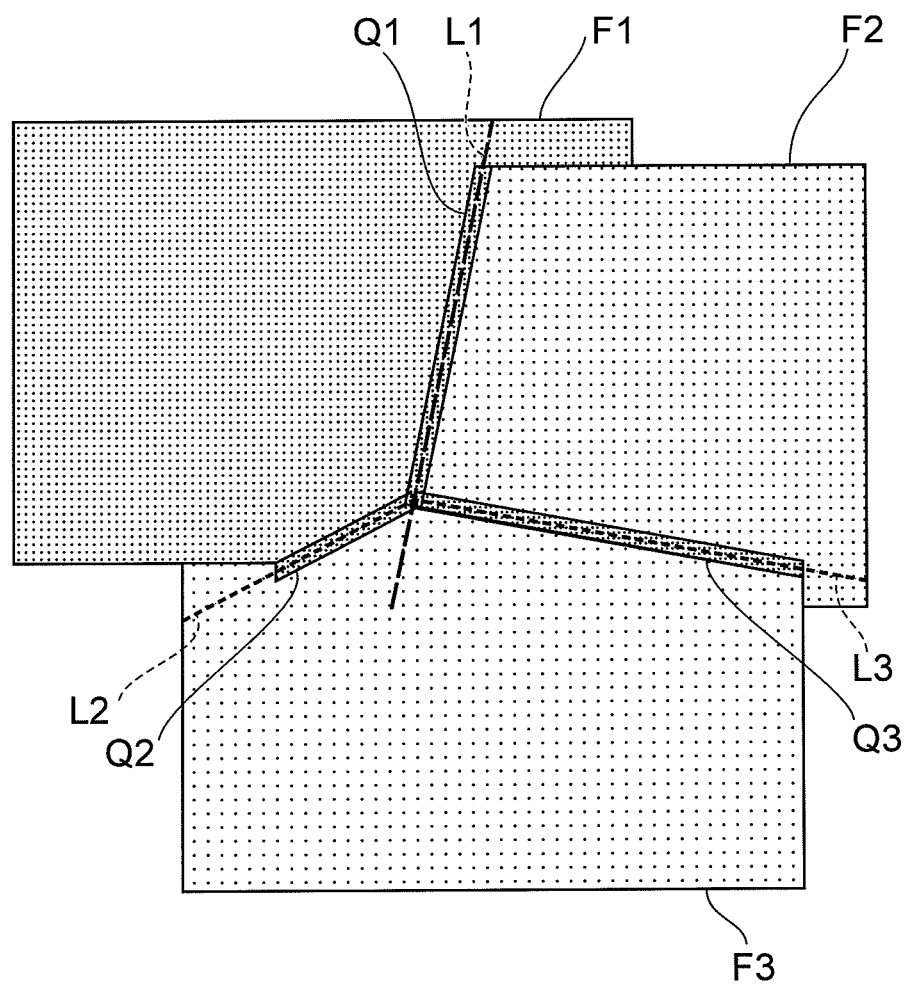
FIG. 9 is a schematic diagram illustrating the synthetic image.

The operation of the image processing device 1 according to this embodiment will now be described. FIG. 5 is a flowchart showing the operation of the image processing device 1 according to this embodiment. The control processing shown in FIG. 5 is executed, for example, when the image capturing function of the mobile terminal 2 is turned on, and the control processing is repeatedly executed at predetermined intervals. For ease of understanding, the operation of the image processing device 1 will be described with reference to FIGS. 6 to 9. FIGS. 6 and 7 are schematic diagrams showing a case where one image is joined to one image that has already been input. FIGS. 8 and 9 are schematic diagrams showing a case where one image is joined to an image that has already been input and synthesized.

As shown in FIG. 5, the image processing device 1 first executes initialization processing (S12). As shown in FIG. 6, the image input portion 10 inputs an image F1 from the camera 30, and stores it as the first image F1 in the first temporary storage region. Then, the center-position obtainment portion 11 obtains position information on the first center point P1 that is the center point of the first image F1. Then, the synthetic image generation portion 12 arranges grid-arrayed points $K_n$ (n: an integer) in a region including the first image F1. Then, the synthetic image generation portion 12 specifies the first center point P1 as the first center point being closest to the grid point $K_n$, associates the first center point P1 with each of the grid points $K_n$, and records it in the center-position storage portion 13. Thereby, the initialization processing is finished. When the processing at S12 is finished, the routine proceeds to input processing of the second image (S14).

In the processing at S14, the image input portion 10 receives the input of the image F2 from the camera 30 and stores it as the second image F2 in the second temporary storage region. Here, the second image F2 is an image having the same size taken at a different image pickup position from that of the first image F1, and is an image having an overlapping region with the first image F1. When the processing at S14 is finished, the routine proceeds to the obtainment processing of the position of the center point (S16).

In the processing at S16, the center-position obtainment portion 11 obtains the position information of the second center point P2, which is the center point of the second image F2. For example, the center-position obtainment portion 11 obtains the position information of the second center point P2 on the basis of the motion vectors of the first image F1 and the second image F2. When the processing at S16 is finished, the routine proceeds to the obtainment processing of the distance between the center points (S18).

In the processing at S18, the distance calculation portion 121 calculates the distance between the first center point P1 and the second center point P2 on the basis of the position information of the first center point P1 obtained in the processing at S12 and the position information of the second center point P2 obtained in the processing at S16. As shown in FIG. 6, a distance C between the first center point P1 of the first image F1 and the second center point P2 of the second image F2 is calculated. By calculating the distance C between the center points, the distance to the perpendicular bisector L1 between the first center point P1 and the second center point P2 can be evaluated, and the perpendicular bisector L1 can be used as the joint between the image F1 and the image F2. When the processing at S18 is finished, the routine proceeds to synthesizing processing (S20).

In the processing in S20, the synthesizing portion 122 generates a synthetic image by joining the image F1 and the image F2. As shown in FIG. 6, the first image F1 and the second image F2 are arranged in a coordinate space of the synthetic image. Then, in a region not overlapping the first image F1 in the second image F2, since the grid point $K_n$ is not arranged, a grid point $K_m$ (m: integer, dotted line in the figure) is newly added. As for the newly added grid point $K_m$, the synthesizing portion 122 specifies the first center point P1 as the first center point being closest to the grid point $K_m$ and associates the first center point P1 with each grid point $K_m$ and records information regarding the association in the center-position storage portion 13. At this time, an infinite point is set to P1.

Then, the synthesizing portion 122 evaluates the distance from the perpendicular bisector L1 for each of the grid points K$_n$ and K$_m$ arranged in the first image F1 and the second image F2 and specifies the pixel values at the grid points K$_n$ and K$_m$. The closeness T is calculated by using the above-mentioned formula 1 in order from the grid point K$_n$ located upper left, for example. Then, by setting 16 to the predetermined value W used in determination on whether or not to synthesize the pixel values and by evaluating the closeness T, the pixel value at the grid point K$_n$ is specified. For example, in the case of a grid point X1, the synthesizing portion 122 refers to the center-position storage portion 13 so as to obtain the closest first center point P1, calculates the distance C between the first center point P1 and the second center point P2, the distance A to the first center point P1 and the distance B to the second center point P2, and then calculates the closeness T using the formula 1. The similar processing is also performed for the grid point X2. Since the grid points X1 and X2 are grid points K$_n$ arranged in the first image F1, the synthesizing portion 122 executes the processing of calculating and evaluating the closeness T as described above. On the other hand, as for the newly added grid points K$_m$, since the closeness T is apparently smaller than the threshold value, the closeness T of these grid points K$_m$ are set at $-\infty$, and the calculation of the closeness T is omitted.

The synthesizing portion 122 evaluates the calculated closeness T for each grid point K$_n$ and if the closeness T of each grid point K$_n$ is larger than 16 in all the cases in the block surrounded by the grid points K$_n$ at the four corners, the processing is skipped for such a block. For example, since the closeness T is larger than 16 for all the grid points X3 to X6, the processing is skipped for the block surrounded by the grid points X3 to X6. On the other hand, if the closeness T is smaller than −16 for the grid points K$_n$ at the four corners, the pixel value of the second image F2 is employed as the pixel value of the block. For example, since the closeness T is smaller than −16 for all the grid points X7 to X10, the second image F2 is copied for the block surrounded by the grid points X7 to X10. Then, if the closeness T is not larger than 16 for all the grid points K$_n$ at the four corners, or if the closeness T is not smaller than −16 for all the grid points K$_n$ at the four corners, the pixel values of the first image F1 and the second image F2 are synthesized as the pixel value of the block. For example, since the closeness T is larger than 0 for the grid points X11 and X12 and the closeness T is smaller than 0 for the grid points X13 and X14, the pixel values of the first image F1 and the second image F2 are synthesized for the block surrounded by the grid points X11 to X14. In this case, the closeness T at the pixel position in the block is linearly interpolated by the closeness T of X11 to X14, and the closeness T at each pixel position is calculated and evaluated by the threshold value W. The method of evaluation is the same as described above. As for the pixel position of the closeness T not less than the threshold value −W and not more than the threshold value W, an weighted average of the pixel value of the first image F1 and the pixel value of the second image F2 is calculated and set as the pixel value at the pixel position. As described above, first, skipping, copying or synthesizing is determined for each unit of block using the grid point K$_n$, and the block including a spot requiring synthesizing is more finely evaluated with the closeness T subjected to linear interpolation for each pixel and determined for skipping, copying or synthesizing. By executing the processing at S20, as shown in FIG. 7, the image F1 and the image F2 are joined by the perpendicular bisector L1 as the joint, and a band-shaped synthesized region Q1 is formed along the perpendicular bisector L1. The width of the synthesized region Q1 is the threshold value W. Then, the image in which the image F2 is joined to the image F1 is stored as the first image in the first temporary storage region. That is, the first image stored in the first temporary storage region is updated. When the processing at S20 is finished, the routine proceeds to the update processing of the center-point position (S22).

The processing at S22 is processing in which the synthesizing portion 122 updates the first center point P1 recorded in the center-position storage portion 13. Since the image F2 is synthesized, there are two first center points P1 and P2. Thus, the synthesizing portion 122 updates the first center point being closest to the grid point K$_n$ for the first image stored in the first temporary storage region. In the case of the grid point X2, for example, since the first center point P1 in the first center points P1 and P2 is closer, which is the same as the previous time, update is not executed. On the other hand, in the case of the grid point X1, for example, since the first center point P2 in the first center points P1 and P2 is closer, the stored information in the center-position storage portion 13 is updated. When the processing at S22 is finished, the routine proceeds to processing of determining presence of the input image (S24).

In the processing at S24, the image input portion 10 determines whether or not there is an image to be further input. For example, if the current count of image pickup times is smaller than the count of automatic continuous shooting times, it is determined there is still an image to be input. In the processing at S24, if it is determined that there is an image to be input, the routine proceeds to the image input processing again (S14). Then, an image F3, for example, is input and stored in the second temporary storage region. Then, the center-position obtainment portion 11 obtains the position of the center point P3 of the image F3 (S16). Then, the distance calculation portion 121 calculates the distances between the first center points P1 and P2 of the synthetic image made of the image F1 and the image F2 stored in the first temporary storage region and the second center point P3 of the input image F2, respectively (S18). Then, the synthesizing portion 122 generates the synthetic image by joining the images F1 and F2 to the image F3. As shown in FIG. 8, the first images F1 and F2 and the second image F3 are arranged in the coordinate space of the synthetic image. Since the grid point K$_n$ is not arranged in the region not overlapping the first images F1 and F2 in the second image F3, the grid point K$_m$ (m: integer, dotted line in the figure) is newly added. Then, as for the newly added grid point K$_m$, the synthesizing portion 122 specifies the first center point P3 as the first center point being closest to the grid point K$_m$, associates the first center point P3 with each grid point K$_m$ and records information of the association in the center-position storage portion 13. Then, the synthesizing portion 122 evaluates the distance from the perpendicular bisectors L2 and L3 for each grid points K$_n$ and K$_m$ (X15, X16, X17 and the like, for example) arranged in the first images F1 and F2 and the second image F3 similarly to the case of joining the images F1 and F2 and specifies the pixel values at the grid points K$_n$ and K$_m$. As a result, as shown in FIG. 9, an image in which the images F1, F2, and F3 are synthesized is generated. After the synthesizing, the synthesizing portion 122 updates the center-point position of the grid point K$_n$ (S22). As described above, if there is an input image, the processing at S14 to S24 is repeatedly executed.

On the other hand, in the processing at S24, if it is determined that there is no input image, the routine proceeds to the display processing (S26). In the processing at S26, the image processing device 1 outputs the synthetic image stored in the first temporary storage region to the display portion 31 to be displayed. The image processing device 1 may output the image to the display portion 31 after cutting out both the ends of the synthetic image and adjusting the size thereof. When the processing at S26 is finished, the control processing shown in FIG. 5 is finished. The processing at S26 may be executed each time the image is input (that is, between S20 and S24).

By executing the control processing shown in FIG. 5, sequential synthesizing with low load and at high speed can be performed. The processing in S12 and S16 corresponds to a center-position obtainment step; the processing in S18 to S24 corresponds to a synthetic image generation step.

Subsequently, an image processing program that causes the mobile terminal (computer) 2 to function as the image processing device 1 will be described.

The image processing program comprises a main module, an input module, and a calculation processing module. The main module is a portion for integrally controlling the image processing. The input module operates the mobile terminal 2 so as to obtain an input image. The calculation processing module comprises a center-position obtaining module, a distance calculating module, and a synthesizing module. Functions realized by executing the main module, the input module, and the calculation processing module are the same as the functions of the above-mentioned image input portion 10, the center-position obtainment portion 11, the distance calculation portion 121, and the synthesizing portion 122 of the image processing device 1, respectively.

The image processing program is provided from a storage medium such as a ROM and the like or a semiconductor memory, for example. Also, the image processing program may be provided as a data signal via a network.

As described above, according to the image processing device 1, the image processing method and the image processing program of this embodiment, the center-position obtainment portion 11 obtains the position information on the first center point of each of images constituting the first image and the second center point of the second image, and the synthetic image generation portion 12 obtains the first center point of an image among the images constituting the first image that overlaps the second image and generates, based on the obtained position information on the first center points and the position information on the second center point, the synthetic image by joining the first image and the second image using the perpendicular bisector between the obtained first center points and the second center point as the joint between the first image and the second image. Since, as described above, when the first image and the input second image are accumulatively synthesized, they can be synthesized by specifying the joint of the images from the information on the center points of the images, it is possible to realize sequential synthesizing process at high speed under low load. Furthermore, since the perpendicular bisector is used to reduce the amount of deviation between the first image and the second image, it is possible to enhance the quality of the synthetic image.

Moreover, according to the image processing device 1, the image processing method and the image processing program of this embodiment, since the center-position obtainment portion 11 obtains the motion vector based on an image input immediately before the second image among the images constituting the first image and the second image, and obtains the position information on the second center point based on the obtained motion vector, it is possible to rapidly and appropriately determine the position of the second image to be joined without performing matching processing and the like.

Furthermore, according to the image processing device 1, the image processing method and the image processing program of this embodiment, the synthetic image generation portion 12 determines a pixel value in a predetermined position of the synthetic image based on the distance from the perpendicular bisector between the first center point being closest to the predetermined position and the second center point, and thus it is possible to synthetic images by simple computation processing.

Moreover, according to the image processing device 1, the image processing method and the image processing program of this embodiment, the region where pixel values are synthesized can be limited from the perpendicular bisector to a region within a predetermined range, and thus it is possible not only to perform processing for generating the synthetic image at high speed but also to reduce, for example, even when the second image is blurred or displaced, its influences exerted on the synthetic image and generate the smooth synthetic image.

Moreover, according to the image processing device 1, the image processing method and the image processing program of this embodiment, the first center point being closest to the grid point is recorded, and thus it is unnecessary to compare the center points of all images constituting the first image with the center point of the second image, for each of the pixels where the first image overlaps the second image. It is therefore possible not only to reduce the processing time or the processing cost but also to decrease a load on the computation processing.

Moreover, according to the image processing device 1, the image processing method and the image processing program of this embodiment, the pixel value within the block can be determined without all the distances in each of the pixel positions within the block being calculated, it is possible to decrease a load on the computation processing. Furthermore, since a determination is made as to whether or not copying is conducted for each of the blocks surrounded by the grid points, and thus the synthesizing process can be performed on an individual block basis, it is possible to further decrease a load on the computation processing.

The embodiment described above is one example of the image processing device according to the present invention. The image processing device according to the present invention is not limited to the image processing device 1 of the present embodiment; the image processing device according to the present embodiment may be varied and applied to other devices without departing the subject matter of each claim.

For example, the example in which the camera 30 continuously takes a still image was described in the above-mentioned embodiment, but the camera 30 may be a camera that takes moving images. In this case, the image input portion 10 may have a function of extracting continuous images from the moving images taken by the camera. Also, the image input by the image input portion 10 may be an image transmitted from another device via a network.

Also, in the above-mentioned embodiment, the size of the images taken by the camera 30 was described to be the same, but the size of the taken image may be different at each taking.

Also, in the above-mentioned embodiment, the case that the center-position obtainment portion 11 calculates the motion vector using the input image and the image input immediately before was described, but the calculation method of the motion vector is not limited thereto. For example, the motion vector may be calculated by using the input image and the synthetic image generated until then.

Moreover, in the above-mentioned embodiment, the region surrounded by the grid points was described to be rectangular, but the shape may be a triangle or other polygons.

REFERENCE SIGNS LIST

1: Image processing device, 10: Image input portion, 11: Center-position obtainment portion, 12: Synthetic image generation portion, 121: Distance calculation portion, 122: synthesizing portion, 13: Center-position storage portion, 31: Display portion

The invention claimed is:

1. An image processing device that accumulatively generates a synthetic image by joining a first image, which is a single image or is constituted by a plurality of the images joined together, and a second image that is input, the device comprising:
at least one processor that executes:
a center-position obtainment portion that obtains position information on a first center point being a center point of each of the images constituting the first image and position information on a second center point being a center point of the second image; and
a synthetic image generation portion that obtains the first center points of an image overlapping the second image among the images constituting the first image, and that joins the first image and the second image to generate the synthetic image, using perpendicular bisectors between the obtained first center points and the second center point as a joint between the first image and the second image, based on the obtained position information on the first center points and the obtained position information on the second center point,
wherein the synthetic image generation portion determines a pixel value at a predetermined position of the synthetic image based on a distance from a perpendicular bisector between the first center point being closest to the predetermined position and the second center point, and
wherein the synthetic image generation portion:
determines a pixel value of the first image as the pixel value at the predetermined position when the distance is more than a predetermined value and the predetermined position is closer to the first center point than to the second center point,
determines a pixel value of the second image as the pixel value at the predetermined position when the distance is more than the predetermined value and the predetermined position is closer to the second center point than to the first center point, and
determines a pixel value at the predetermined position by synthesizing the pixel value of the first image and the pixel value of the second image when the distance is not more than the predetermined value.

2. The image processing device of claim 1, wherein the first image is either an image input immediately before the second image or the synthetic image generated by the synthetic image generation portion.

3. The image processing device of claim 1, wherein the center-position obtainment portion obtains a motion vector based on the first image and the second image, and obtains the position information based on the obtained motion vector.

4. The image processing device of claim 1, wherein the synthetic image generation portion regards a position in grid points arranged in the grid-arrayed points as the predetermined position and records the first center point being closest to the grid point for each of the grid points.

5. The image processing device of claim 4, wherein the synthetic image generation portion determines a pixel value within a block surrounded by the grid points based on the distance determined for each of the grid points.

6. The image processing device of claim 5, wherein the synthetic image generation portion:
determines the pixel values of the first image as the pixel values within the block when the distances of all the grid points surrounding the block are more than the predetermined value and positions of all the grid points surrounding the block are closer to the first center point than to the second center point, and
determines the pixel values of the second image as the pixel values within the block when the distances of all the grid points surrounding the block are more than the predetermined value and positions of all the grid points surrounding the block are closer to the second center point than to the first center point.

7. The image processing device of claim 4, wherein the synthetic image generation portion updates, after generating the synthetic image, the closest first center point for each of the grid points.

8. An image processing method of accumulatively generating a synthetic image by joining a first image, which is a single image or is constituted by a plurality of the images joined together, and a second image that is input, the method comprising:
acquiring position information on a first center point which is a center point of each of the images constituting the first image and position information on a second center point which is a center point of the second image; and
acquiring, by at least one processor, the first center points of images which overlaps the second image among the images constituting the first image, and joining the first image and the second image to generate the synthetic image, using perpendicular bisectors between the acquired first center points and the second center point as a joint between the first image and the second image, based on the acquired position information on the first center points and the acquired position information on the second center point,
wherein the synthetic image generation portion determines a pixel value at a predetermined position of the synthetic image based on a distance from a perpendicular bisector between the first center point being closest to the predetermined position and the second center point, and
wherein the synthetic image generation portion:
determines a pixel value of the first image as the pixel value at the predetermined position when the distance is more than a predetermined value and the predetermined position is closer to the first center point than to the second center point,
determines a pixel value of the second image as the pixel value at the predetermined position when the distance is more than the predetermined value and the predetermined position is closer to the second center point than to the first center point, and
determines a pixel value at the predetermined position by synthesizing the pixel value of the first image and the pixel value of the second image when the distance is not more than the predetermined value.

9. A non-transitory computer-readable storage medium storing an image processing program causing a computer so as to accumulatively generates a synthetic image by joining a first image, which is a single image or is constituted by a plurality of the images joined together, and a second image that is input, the program causing the computer to function as:

a center-position obtainment portion that obtains position information on a first center point which is a center point of each of the images constituting the first image and position information on a second center point which is a center point of the second image; and a synthetic image generation portion that obtains the first center points of images which overlaps the second image among the images constituting the first image, and that joins the first image and the second image to generate the synthetic image, using perpendicular bisectors between the obtained first center points and the second center point as a joint between the first image and the second image, based on the obtained position information on the first center points and the obtained position information on the second center point, wherein the synthetic image generation portion determines a pixel value at a predetermined position of the synthetic image based on a distance from a perpendicular bisector between the first center point being closest to the predetermined position and the second center point, and wherein the synthetic image generation portion:
determines a pixel value of the first image as the pixel value at the predetermined position when the distance is more than a predetermined value and the predetermined position is closer to the first center point than to the second center point, determines a pixel value of the second image as the pixel value at the predetermined position when the distance is more than the predetermined value and the predetermined position is closer to the second center point than to the first center point, and determines a pixel value at the predetermined position by synthesizing the pixel value of the first image and the pixel value of the second image when the distance is not more than the predetermined value.

10. An image processing device that accumulatively generates a synthetic image by joining a first image, which is a single image or is constituted by a plurality of the images joined together, and a second image that is input, the device comprising:

at least one processor that executes:
a center-position obtainment portion that obtains position information on a first center point being a center point of each of the images constituting the first image and position information on a second center point being a center point of the second image; and a synthetic image generation portion that obtains the first center points of an image overlapping the second image among the images constituting the first image, and that joins the first image and the second image to generate the synthetic image, using perpendicular bisectors between the obtained first center points and the second center point as a joint between the first image and the second image, based on the obtained position information on the first center points and the obtained position information on the second center point, wherein the synthetic image generation portion determines a pixel value at a predetermined position of the synthetic image based on a distance from a perpendicular bisector between the first center point being closest to the predetermined position and the second center point, wherein the synthetic image generation portion regards a position in grid points arranged in the grid-arrayed points as the predetermined position and records the first center point being closest to the grid point for each of the grid points, wherein the synthetic image generation portion determines a pixel value within a block surrounded by the grid points based on the distance determined for each of the grid points, and wherein the synthetic image generation portion:
determines the pixel values of the first image as the pixel values within the block when the distances of all the grid points surrounding the block are more than the predetermined value and positions of all the grid points surrounding the block are closer to the first center point than to the second center point, and determines the pixel values of the second image as the pixel values within the block when the distances of all the grid points surrounding the block are more than the predetermined value and positions of all the grid points surrounding the block are closer to the second center point than to the first center point.

11. The image processing device of claim 10, wherein the first image is either an image input immediately before the second image or the synthetic image generated by the synthetic image generation portion.

12. The image processing device of claim 10, wherein the center-position obtainment portion obtains a motion vector based on the first image and the second image, and obtains the position information based on the obtained motion vector.

13. The image processing device of claim 10, wherein the synthetic image generation portion updates, after generating the synthetic image, the closest first center point for each of the grid points.

14. An image processing method of accumulatively generating a synthetic image by joining a first image, which is a single image or is constituted by a plurality of the images joined together, and a second image that is input, the method comprising:

acquiring position information on a first center point which is a center point of each of the images constituting the first image and position information on a second center point which is a center point of the second image; and acquiring, by at least one processor, the first center points of images which overlaps the second image among the images constituting the first image, and joining the first image and the second image to generate the synthetic image, using perpendicular bisectors between the acquired first center points and the second center point as a joint between the first image and the second image, based on the acquired position information on the first center points and the acquired position information on the second center point, wherein the synthetic image generation portion determines a pixel value at a predetermined position of the synthetic image based on a distance from a perpendicular bisector between the first center point being closest to the predetermined position and the second center point, wherein the synthetic image generation portion regards a position in grid points arranged in the grid-arrayed points as the predetermined position and records the first center point being closest to the grid point for each of the grid points, wherein the synthetic image generation portion determines a pixel value within a block surrounded by the grid points based on the distance determined for each of the grid points, and wherein the synthetic image generation portion:
determines the pixel values of the first image as the pixel values within the block when the distances of all the grid points surrounding the block are more than the predetermined value and positions of all the grid points surrounding the block are closer to the first center point than to the second center point, and determines the pixel values of the second image as the pixel values within the block when the distances of all the grid points surrounding the block are more than the predetermined value and positions of all the grid points surrounding the block are closer to the second center point than to the first center point.

15. A non-transitory computer-readable storage medium storing an image processing program causing a computer so as to accumulatively generates a synthetic image by joining a first image, which is a single image or is constituted by a plurality of the images joined together, and a second image that is input, the program causing the computer to function as:

a center-position obtainment portion that obtains position information on a first center point which is a center point of each of the images constituting the first image and position information on a second center point which is a center point of the second image; and a synthetic image generation portion that obtains the first center points of images which overlaps the second image among the images constituting the first image, and that joins the first image and the second image to generate the synthetic image, using perpendicular bisectors between the obtained first center points and the second center point as a joint between the first image and the second image, based on the obtained position information on the first center points and the obtained position information on the second center point, wherein the synthetic image generation portion determines a pixel value at a predetermined position of the synthetic image based on a distance from a perpendicular bisector between the first center point being closest to the predetermined position and the second center point, wherein the synthetic image generation portion regards a position in grid points arranged in the grid-arrayed points as the predetermined position and records the first center point being closest to the grid point for each of the grid points, wherein the synthetic image generation portion determines a pixel value within a block surrounded by the grid points based on the distance determined for each of the grid points, and wherein the synthetic image generation portion:

determines the pixel values of the first image as the pixel values within the block when the distances of all the grid points surrounding the block are more than the predetermined value and positions of all the grid points surrounding the block are closer to the first center point than to the second center point, and determines the pixel values of the second image as the pixel values within the block when the distances of all the grid points surrounding the block are more than the predetermined value and positions of all the grid points surrounding the block are closer to the second center point than to the first center point.

* * * * *